United States Patent
Vignoles et al.

(10) Patent No.: US 8,590,711 B2
(45) Date of Patent: Nov. 26, 2013

(54) METHOD FOR DIAGNOSING THE OPERATION OF A WATER PURIFICATION INSTALLATION OF THE FILTER MEDIUM DEVICE TYPE, AND A DIAGNOSTIC TOOL SUITABLE FOR SAID METHOD

(75) Inventors: Christian Vignoles, Blagnac (FR); Pascal Molle, Lyons (FR); Alain Lienard, Anse (FR); Laurence Rolland, Caluire et Cuire (FR); Pierre Breul, Corent (FR); Fathe Bouteldja, Clermont Ferrand (FR); Daniel Boissier, Romagnat (FR)

(73) Assignees: Veolia Eau-Compagnie Generale des Eaux, Paris (FR); Centre National du Machinisme Agricole, du Genie Rural, des Eaux et des Forets (CEMAGREF), Antony (FR); Universite Blaise Pascal—Clermont II, Clermont-Ferrand (FR)

( * ) Notice: Subject to any disclaimer, the term of this patent is extended or adjusted under 35 U.S.C. 154(b) by 212 days.

(21) Appl. No.: 13/145,088

(22) PCT Filed: Jan. 18, 2010

(86) PCT No.: PCT/FR2010/050066
§ 371 (c)(1),
(2), (4) Date: Oct. 26, 2011

(87) PCT Pub. No.: WO2010/082002
PCT Pub. Date: Jul. 22, 2010

(65) Prior Publication Data
US 2012/0031194 A1    Feb. 9, 2012

(30) Foreign Application Priority Data

Jan. 19, 2009 (FR) ..................... 09 50287

(51) Int. Cl.
*B01D 24/00* (2006.01)
(52) U.S. Cl.
USPC ....................................................... 210/348
(58) Field of Classification Search
USPC ..................... 210/386, 348, 108, 169, 416.2
See application file for complete search history.

(56) References Cited

U.S. PATENT DOCUMENTS

| | | | | |
|---|---|---|---|---|
| 4,533,476 | A * | 8/1985 | Watkins | 210/805 |
| 5,328,602 | A * | 7/1994 | Brooks | 210/167.1 |
| 7,252,761 | B2 * | 8/2007 | Lamberts Van Assche | 210/167.12 |
| 2013/0173458 | A1 * | 7/2013 | Hill et al. | 705/39 |
| 2013/0175366 | A1 * | 7/2013 | Zoller et al. | 239/428.5 |

* cited by examiner

*Primary Examiner* — Jewel V Thompson
(74) *Attorney, Agent, or Firm* — Morris & Kamlay LLP

(57) ABSTRACT

The invention relates to a method of diagnosing the operation of a water purification installation of the filter medium device type, the material of the filter medium being made up of particles, the method including the following steps: a characterization step of characterizing at least one physical and/or mechanical parameter of the filter medium device to establish a permeability value Ks (expressed in m/s); a comparison step of comparing said established permeability value Ks with a predetermined range $[k_{min}; k_{max}]$ of permeability values representing a satisfactory operating state of the purification installation; and a diagnosis step during which the filter medium device is assigned an operation indicator according to the result of the comparison step. Applications include non-collective sanitation (NCS) systems and stand-alone sanitation systems.

15 Claims, 1 Drawing Sheet

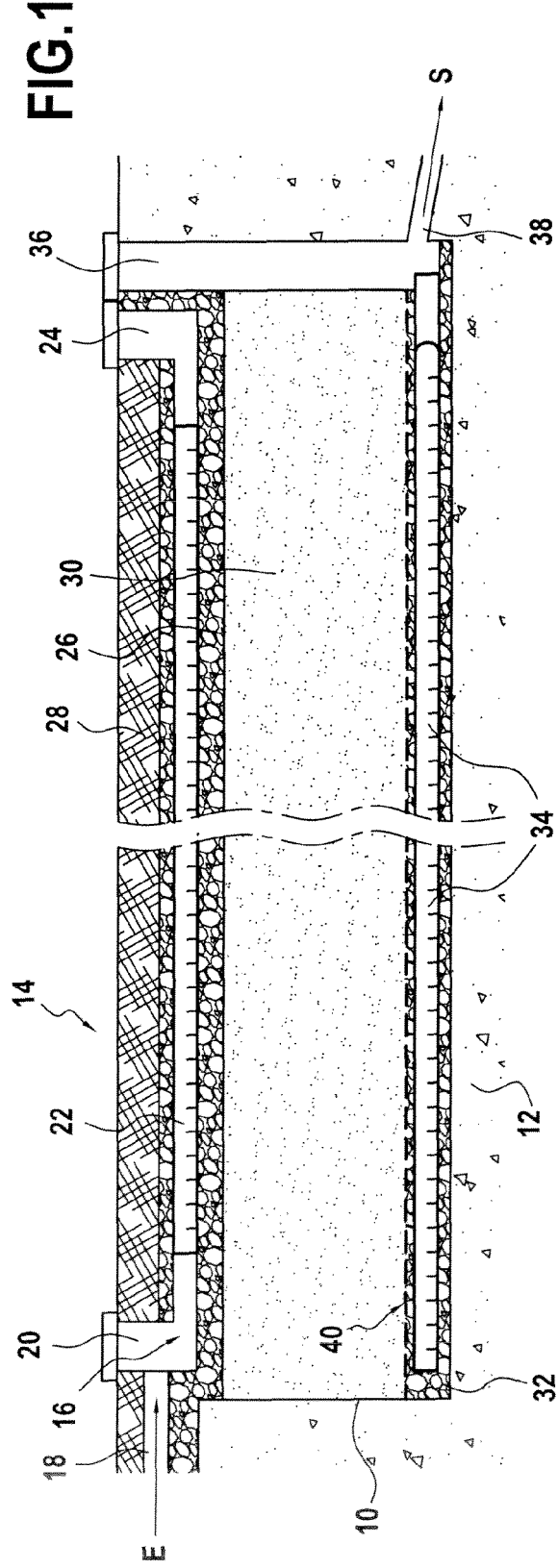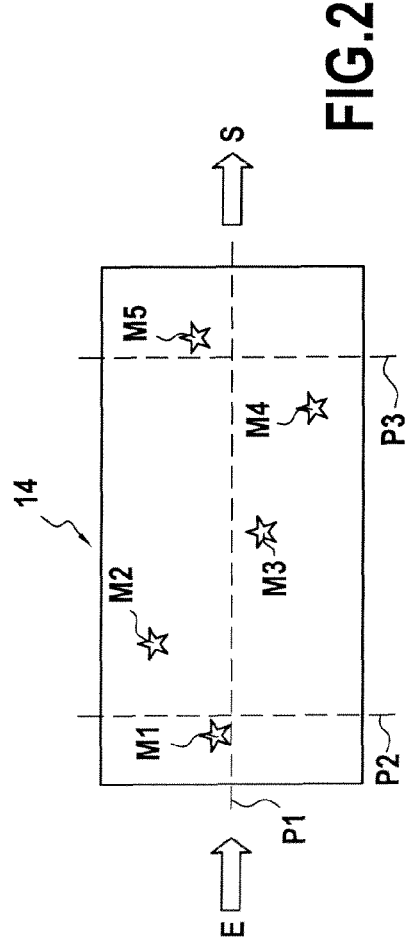

METHOD FOR DIAGNOSING THE OPERATION OF A WATER PURIFICATION INSTALLATION OF THE FILTER MEDIUM DEVICE TYPE, AND A DIAGNOSTIC TOOL SUITABLE FOR SAID METHOD

CROSS-REFERENCE TO RELATED APPLICATIONS

This application is a National Phase of PCT Application Serial No. PCT/FR10/50066, filed Jan. 18, 2010, which is an international application of French Appl. No. 0950287, filed on Jan. 19, 2009, each of which is incorporated by reference in their entirety.

The present invention relates to a method of diagnosing the operation of a water purification installation of the filter medium device type and to a diagnostic tool suitable for said method. Such a water purification installation of the filter medium device type, for example one using a vertical filter medium, and in particular a sand filter, is used for treating via the soil domestic waste water following pretreatment that is generally anaerobic.

The treatment carried out by these water purification installations of the filter medium device type relies on the action of micro-organisms (biomass) naturally present in the waste water, here bacteria that are fixed onto the filter medium (for example the sand) and break down pollutants (aerobic treatment using cultures fixed to finely divided supports).

After treatment, the treated domestic waste water is either infiltrated into the soil on site or reconstituted (undrained sand filter) or evacuated via a collection network to an outlet (drained sand filter).

These water purification installations of the filter medium device type are particularly used in non-collective sanitation (NCS) systems or stand-alone sanitation systems for treating domestic waste water from buildings not connected to the public sanitation network, which are mainly private houses or apartment buildings with up to ten main rooms.

In France, these sanitation systems are governed in particular by a decree of May 6, 1996 and the XP DTU 64.1 standard defining applicable technical provisions that indicate the means to be used.

However, implementing those technical provisions cannot in itself guarantee correct operation of the purification installation and in particular does not make it possible to prevent operating conditions deteriorating over time.

Moreover, those purification installations do not necessarily comply with environmental requirements (the decree of May 6, 1996 sets a minimum quality required for the discharge, as measured at the outlet from the purification installation on a representative sample, after two hours without settling, which is 30 milligrams per Liter (mg/L) for materials in suspension and 40 mg/L for the five-day biochemical oxygen demand ($BOD_5$)).

The only diagnostic methods available at present rely on external manifestations (odour, foam, color, hydraulic reflux) and cannot show exactly why these anomalies are encountered, although their origins are to be found within the filter medium device itself.

The present invention proposes to provide an in situ and non-destructive diagnostic method that enables evaluation of the purification performance of a water purification installation of the filter medium device type, in particular one using a sand filter, notably a vertical sand filter.

To this end, the method of the present invention of diagnosing the operation of a water purification installation of the filter medium type, the material of the filter medium being made up of particles, includes the following steps:
- a characterization step of characterizing at least one physical and/or mechanical parameter of the filter medium device to establish a permeability value;
- a comparison step of comparing said established permeability value with a predetermined range of permeability values representing a satisfactory operating state of the purification installation; and
- a diagnosis step during which the filter medium device is assigned an operation indicator according to the result of the comparison step.

Work carried out by the applicants has enabled determination of the characteristics of correct operation of a filter medium device or NCS filter, in particular a vertical sand filter.

For a vertical sand filter to operate correctly, the following must be avoided (these provisions also apply to filter media other than sand):
- too high a permeability, as the excessively fast passage of the effluents then leads to poor purification performance; high permeabilities generate fast localized flows compromising purification performance (contact time too short, detachment of the biomass, etc.); and
- too low a permeability, as the service life of the sand filter is then too short (precocious clogging); in contrast to high permeabilities, excessively low permeabilities of the virgin material induce risks of engorgement of the filter mass by the biomass, which may lead to anaerobic operation and premature clogging of the system.

The permeability of the filter is in particular a function of:
- the physical characteristics of the material constituting the sand filter: the particle size curve gives representative values of the particle size distribution of the material (d, D, Cu, etc.);
- the conditions of use of the sand in the filter: the tightness or compaction state of the material constituting the sand filter defined on the basis of the density ($\gamma$), the porosity (n), or the voids index (e);
- the shape of the particles: virgin crushed sand from a quarry retains more water by capillarity than rolled alluvial sand, whence faster colonization by the bacteria-containing biomass; and
- the combination of a plurality of conditions enabling correct development of biochemical action and creation of the biomass (gas concentration, notably oxygen concentration in the sand).

Clearly one or more permeability values ("saturated" permeability values ks expressed in cubic meters per square meter per second (m/s)) are established by measuring and/or establishing one or more physical and/or mechanical parameters of the filter medium device, and possibly also a parameter representing the microbiological activity of the filter medium device.

As a function of the situations encountered and parameters of the filter medium device known from elsewhere, the method of the invention adds to information already available on the filter medium device and produces one or more permeability values using analytical models and correlation curves resulting from very many tests and measurements effected in the field and in the laboratory under multiple possible conditions of use.

The permeability value or values attached to the filter medium device whose purification performance is to be evaluated make it possible to establish a diagnosis of correct or incorrect operation of the filter medium device.

The diagnostic step is the result of the step of comparing, firstly, each established permeability value $k_1$ or the range $[k_{1min}; k_{1max}]$ of values comprising some or all of the established permeability values or the mean value of the established permeability values, and, secondly, the range $[k_{min}; k_{max}]$ of predetermined permeability values representing a satisfactory operating state of the purification installation (an optimum range of correct purification performance).

Thus three situations arise:

situation A, no intersection of the ranges of values, i.e. $[k_{1min}; k_{1max}] \cap [k_{min}; k_{max}] = \emptyset$, so the material of the filter medium device is considered to be unusable in a purification installation or to have too limited an efficacy and/or life expectation;

situation B, equality or total intersection of the ranges of values, i.e. $[k_{1\ min}; k_{1\ max}] \subset$ or $= [k_{min}; k_{max}]$, i.e. $[k_{1\ min}; k_{1\ max}]$ included in or identical to $[k_{min}; k_{max}]$, so the material of the filter medium device is considered to be perfectly usable in a purification installation; and situation C, simple partial overlapping between the ranges of values, i.e. $[k_{1\ min}; k_{1\ max}] \cap [k_{min}; k_{max}] \neq \emptyset$, so the material of this filter medium device is considered to be usable in a purification installation under some conditions of use.

A simplified indicator of correct operation, for example one with three levels, may be associated with the result of this diagnosis: for example, indications such as "no", "yes/no", and "yes", values such as "−1", "0", and "1", or colors such as "red", "orange", and "green", respectively representing incorrect operation, limited or risky operation that may not be qualified as either correct or incorrect, and correct operation.

It must be emphasized that work carried out by the applicants has made it possible, taking account in particular of purification performance conforming to the applicable regulations and conditions of correct development of the biomass, to determine optimum thresholds for the operating permeability of a filter medium device defining the optimum range $[k_{min}; k_{max}]$ of correct purification performance.

According to the invention, the predetermined range of permeability values representing a satisfactory operating state belongs to the range defined as follows: $0.3 \times 10^{-5} < Ks < 0.8 \times 10^{-2}$.

Thus, in the range $[k_{min}; k_{max}]$ there is taken as the minimum permeability threshold $k_{min} = 0.3 \times 10^{-5}$ m/s, and preferably $k_{min} = 1 \times 10^{-5}$ m/s, or still $k_{min} = 3 \times 10^{-5}$ m/s and as the maximum permeability threshold $k_{max} = 0.8 \times 10^{-2}$ m/s, and preferably $k_{max} = 0.6 \times 10^{-2}$ m/s or $k_{max} = 0.5 \times 10^{-2}$ m/s.

According to one advantageous feature of the present invention, the diagnostic method includes executing the characterization and comparison steps at a plurality of locations of the filter medium device, whereby a plurality of indicators of the operation of the filter medium device are obtained in order to establish a global diagnosis of the filter medium device.

This gives preference to using different locations in the filter medium device and establishing the permeability associated with each of those locations and then the corresponding indicator of (correct/incorrect) operation of the filter medium device. In this way a diagnosis of the filter medium device that is closer to its real overall operation is obtained from the permeability values that have been established.

The characterization step preferably includes determining at least two physical and/or mechanical parameters representing the local state of the material of the filter medium device. In particular, the physical parameter representing the local state of the material of the filter medium device belongs to the group comprising the tightness (or compaction) state, the clogging state, the saturation state, the particle size, the shape of the grains (more generally, the shape of the particles constituting the material of the filter medium), the mineralogical class of the material constituting the filter medium, and the percentage of fines (particles with dimensions below a predetermined threshold) constituting the filter medium.

The expression partial clogging refers to the situation in which water flows only slowly in the filter medium because most of the voids left between the particles of the filter medium (for example the grains of sand) are partly filled with suspended solids (physical clogging) and/or colonies of bacteria (biological clogging).

The expression total clogging refers to the situation when all the voids left between the particles of the filter medium (for example the grains of sand) are filled with fines, biomass, and possibly free water.

In the presence of clogging, there is a tendency for the permeability to decrease, and it may then fall below $k_{min}$ and in extreme circumstances reach virtually zero permeability.

According to another preferred feature of the invention, the characterization step includes determining at least one physical and geometrical parameter representing the operating state of the filter medium device. In particular, the physical and geometrical parameter representing the operating state of the filter medium device belongs to the group comprising the resistivity profile, the thickness of the filter medium, and the area of the filter medium device.

The diagnostic method advantageously further includes a step of characterizing at least one parameter representing the microbiological activity of the filter medium device, which parameter representing the microbiological activity of the filter medium device is also taken into account in establishing the permeability value Ks (m/s).

In particular, the parameter representing the microbiological activity of the filter medium device belongs to the group comprising the oxygen concentration, the carbon dioxide concentration, the nitrates concentration, and the ammonia salts concentration, the oxygen concentration and the carbon dioxide concentration being measured in the pores of the filter medium and the nitrates concentration and the ammonia salts concentration being measured in water sampled inside the filter medium device or at its outlet.

According to a preferred feature of the present invention, the purification installation of the filter medium device type is a vertical or horizontal sand filter.

The present invention relates further to a diagnostic tool suitable for use in the diagnostic method described above. To this end a diagnostic tool is provided including means for characterizing at least one physical and/or mechanical parameter of the filter medium device, including:

an endoscope; and/or
a penetrometer; and
a system for analyzing and processing information from the characterization means adapted to establish a permeability value and to compare it with a predetermined range of permeability values representing a satisfactory operating state of the purification installation, and means for assigning an indicator of the operation of the filter medium device as a function of the result of the comparison step.

Clearly the information analysis and processing system includes calculation means combining analytical models and calibration curves obtained from experimental data and relating to the different types of filter medium used and the different conditions under which the filter medium is put into place, in order to make it possible to establish a permeability value associated with the results provided by the characterization means of the filter medium device, namely the endoscope and/or the penetrometer in particular.

The characterization means preferably further include a resistivity meter using electrodes.

According to another preferred feature the characterization means preferably include a soil gas sampling and analysis system.

The characterization means preferably further include semi-quantitative strips adapted to measure the nitrates concentration and the ammonia salts concentration in water sampled at the output of the filter medium device.

Thus it is clear that, because the characterization means of the diagnostic tool include different apparatus and/or equipment (endoscope only, penetrometer only, endoscope and penetrometer, possibly complemented by a resistivity meter with electrodes and/or a system for sampling and analyzing soil gases and/or semi-quantitative strips), they make possible different types of measurement and characterization of the purification installation of the filter medium device type, in order to enable use of the diagnostic method of the present invention.

The present invention advantageously relates further to the use of the diagnostic tool as defined above or of the diagnostic method as defined above in a purification installation of the filter medium device type that consists of a sand filter, notably a vertical sand filter or a horizontal sand filter.

Other advantages and features of the invention emerge on reading the following description given by way of example and made with reference to the appended drawings, in which:

FIG. 1 is a view in longitudinal section of a drained sand filter; and

FIG. 2 is a diagrammatic plan view of the FIG. 1 filter, which shows possible locations for effecting the measurements and characterizations of the diagnostic method of the invention.

The following description relates to water purification installations using vertical filter media, but the proposed method is equally applicable to systems using horizontal filter media, such as a horizontal sand filter.

With a drained vertical sand filter, the arrangement is as follows (see FIG. 1).

An excavation 10 is produced in the soil 12 to a depth that may be as much as 2 meters (m) or 3 m and contains the sand filter 14, which includes:

in its upper portion (at the top in FIG. 1): a flat spreader system 16 that includes a pretreated water inlet pipe 18 (on the left in FIG. 1, the arrow E representing entry of the liquid effluent), and a distribution box 20 that feeds a series of parallel spreader pipes 22 that are provided with downward-facing slots and that are joined together at a looping box 24; the spreader system 16 rests on a layer 26 of gravel and is covered with topsoil 28 from the surface of which the distribution box 20 and the looping box 24 are accessible;

in its intermediate portion, constituting the treatment portion as such, sand 30 to a depth of the order of 70 centimeters (cm), preferably washed sand with the majority of its fines (particles having a dimension less than 80 micrometers ($\mu$m) removed; and in its lower portion (at the bottom in FIG. 1): a bed of gravel 32 containing a series of collector pipes 34 that are joined together at a collector box 36 accessible from the surface of the sand filter 14 and connected to an evacuation pipe 38 (the arrow S representing the exit of treated water) in the direction of an outlet (not shown).

There is optionally a geogrid 40 between the gravel bed 32 and the sand 30. There may also be a geotextile covering (not shown) between the topsoil covering 28 and the gravel layer 26, together with a one-piece impermeable film covering the walls and the bottom of the excavation (particularly if it is of fissured rock).

An undrained sand filter differs from the above description in that the elements of the lower portion (gravel bed 32, collector pipes 34, collector box 36, and evacuation pipe 38) are not present, the sand 30 then resting on the soil 12 (with or without a geogrid 40).

The various characterization means that the diagnostic tool of the present invention may include are described below:

Penetrometer: this includes a series of rods measuring the resistance of the soil to driving in the rods, giving soil tightness or compaction data via computer processing and pre-established calibration curves. Using a variable energy dynamic penetrometer facilitates the test, which then consists in hammering a series of rods into the soil. The results are provided in the form of a "penetrogram" giving the variation of the dynamic cone resistance (qd) as a function of depth. In addition to the tightness or compaction state, this test also provides information relating to the thickness of the sand of the filter and the area covered by the filter.

Endoscope: in the context of the invention, endoscopy consists in introducing an endoscope into the cavity previously produced following a penetrometer test or any other drilling test. A continuous film is then recorded of the entire cavity, which is then subjected to automatic image analysis based on a study of color and texture parameters in order to characterize the various layers of the soil, to distinguish them morphologically, and to characterize more or less completely the material constituting the layer, for example in accordance with a geotechnical classification. The endoscopy test serves in particular to verify the clogging state and the saturation state, providing indications about particle size and grain shape, and possibly assistance with determining mineralogical class. It also provides information relating to the thickness of the sand of the filter, the depth of the topsoil covering the filter, and where applicable the presence of the geotextile and/or the geogrid.

Resistivity meter with electrodes: this meter measures voltages between surface electrodes in the soil above the filter and longitudinally or transversely aligned therewith in accordance with a variety of interrogation schemes (quadripoles). The investigation depth of a given quadripole increases if the distance between the electrodes is increased, but this reduces accuracy. After processing the data, a resistivity profile is obtained that consists of a pseudo-section that is a vertical image, like a soil section, of the apparent resistivity variations as a function of depth along a longitudinal or transverse profile. Thus by establishing a map of the various filter zones as a function of resistivity, this technique, by indicating more or less resistive zones of the filter, provides a high-likelihood knowledge of the moisture level (there is no strict correspondence between resistivity values and moisture content values). This map of the more or less resistive zones of the filter medium nevertheless serves as a guide for identifying the various regions of operation of the filter (low-resistivity zones that are a priori moist, unused zones, etc.), to which other tools providing local information may be applied. Thus the resistivity profile or global resistivity gives a first indication about the distribution of water in the filter, where applicable its clogging state, and where applicable its saturation state if all the profiles are of low resistivity. The expression "total saturation" is used when all the voids left between the grains of sand are filled with water. A saturation state may in particular occur if a water table present in the subsoil temporarily rises as high as the filter.

Soil gas sampling and analysis system, for measuring gases in the sand of the filter: The apparatus is connected to a probe that may be placed at various locations and depths of the filter mass and indicates the respective concentrations of $O_2$ (oxygen) and $CO_2$ (carbon dioxide) in the pores of the filter mass. These indicate biological purification activity and operating conditions with regard to pollutants received by the filter and possibilities for renewing these gases offered by the design of the structure.

Chemical or semi-quantitative strips for measuring the concentration of nitrates and the concentration of ammonia salts in water sampled at the outlet of a drained filter.

There is added to the data obtained from these various in situ characterization means used by the diagnostic method of the invention all the information from earlier diagnoses, where possible, and all the data relating to the history of the filter, such as the initial conditions of use and the composition of the material, and any characterizations of the filter material obtained by taking a sample.

The use of the diagnostic method of the invention in different situations is described below.

EXAMPLE 1

Consider a new filter: here it is a question of making a diagnosis on acceptance testing of the structure, the type of sand used being known with greater or lesser precision (physical characteristics of the material including one or more of the following parameters: particle size, grain shape, sand type (rolled or crushed) and composition, and possibly some conditions of use (filter area, filter thickness, mechanical characteristics such as compaction range). In contrast, since the filter has not been commissioned at this stage, it follows that the microbiological aspect of the filter cannot be taken into consideration.

It is possible, starting from the physical characteristics of the material (known and/or obtained by analyzing a sample and/or by carrying out endoscopy tests), and from the determination or verification of the minimum and maximum density (tightness or compaction state obtained by penetrometer tests) of the material (obtained by carrying out laboratory tests), to estimate the real permeability $k_1$ of the material at each point where a penetrometer and/or endoscope test has been carried out, and thus the real range of permeability values of the material in the filter as a function of its use $[k_{1min}; k_{1max}]$ and the global permeability coefficient obtained from the mean value of the established permeability values Ks.

Comparing this real permeability range $[k_{1min}; k_{1max}]$ (or each established permeability value $k_1$ or the global permeability coefficient) with the optimum range $[k_{min}; k_{max}]$ of correct purification performance leads to the three situations referred to above.

EXAMPLE 2

Here it is a question of producing the in situ diagnosis of a filter for which no information is available.

Sometimes, it is necessary to find out the precise location of the filter and the area that it covers beforehand. The necessary accessibility of the manholes and manhole covers of the septic tank or the all water tank must guide the search for the approximate location of the sand filter on the plot of land in the absence of any verification plan or indications provided by the occupant of the dwelling. As early as this stage, a global resistivity measurement and immediate processing thereof can assist if the characteristics and the moisture content of the surrounding soil are different.

As soon as the filter has been correctly located, another resistivity test provides additional information on the approximate dimensions and location of the filter under the layer of soil. The first step is then to define the geometry of the filter, i.e. the number, nature and thickness of the layers present. The standard descriptions available in the XP DTU 64.1 standard are relied on in particular to begin to interpret the first indicators provided by resistivity and/or geo-endoscopy and/or penetrometer tests (different cone resistances between the topsoil layer 28 covering the filter 14, the geotextile covering, if present, the layer 32 of gravel surrounding the distribution network, and the sand 30).

Principally, this is a matter of effecting the characterizations for defining one or more local permeability coefficients of the filter, each of which is compared to the predefined range $[k_{min}; k_{max}]$ for correct operation and for obtaining a map of the filter (indicating filter zones that are clogged, saturated, etc.). Instead of or in addition to this, this comparison is effected using the established range $[k_{1\ min}; k_{1\ max}]$ of permeability coefficients or the mean value of the established permeability values (also referred to as the global permeability coefficient).

If clogging is proven, each permeability coefficient of the filter concerned, and if necessary the global permeability coefficient, is calculated pro rata the thicknesses and, if they are known (notably if the three resistivity profiles referred to above enable them to be estimated), pro rata the approximate areas of clogged material and healthy material.

FIG. 2 illustrates the methodology proposed:

Three resistivity profiles P1, P2, and P3 are produced: a longitudinal resistivity profile P1 extending from the entry (arrow E) to the exit (arrow S), substantially in the middle of the width of the filter 14, and two transverse resistivity profiles P2 and P3 respectively situated in the first and last thirds of the filter 14.

Four or five point soundings M1, M2, M3, M4, and M5 are effected at five locations regularly distributed along the filter between the entry (arrow E) and the exit (arrow S) and over the width of the filter 14. At each sounding point M1 to M5, one or more or all of the following tests are performed: a penetrometer test, a geo-endoscopy test, a gas measurement.

Finally, if the filter is a drained filter, tests are effected on semi-quantitative strips at the filter exit.

The choice of the test or tests to be carried out depends on available information relating to the filter and the expected accuracy of the established permeability value.

The following information is obtained by means of some or all of these tests:

The global resistivity must initially make it possible to locate the filter, determine its general geometry (length, thickness), and establish a map of the different zones of the filter as a function of the moisture content. It then enables the distribution of the moisture content of the filter to be quantified.

The penetrometer and/or geo-endoscopy tests must make it possible to identify the various layers of materials (nature and thickness), to characterize the filter material (particle size and compaction state), and to detect severe pathologies (clogged zones and thickness, saturated zones).

The gas measurements must enable:
firstly, highlighting of biological activity indicating a development of the purification biomass that is linked to $O_2$ consumption and $CO_2$ rejection; and then
secondly, evaluating if the a priori conditions of correct operation of the filter are met (possible gas transfers or location of limitations), and the evolution of this operation over a plurality of campaigns with regard to the number of people present in the dwelling.

The semi-quantitative strip tests must enable the water purification performance of the filter to be validated. For a drained filter, they provide a reliable indication of the oxidizing or reducing nature of the operating conditions that prevail inside the filter as a whole. A high concentration of nitrates and a low concentration of ammonia salts reveal correct operation and very likely low residual concentrations of organic material (BOD and suspended solids). In contrast, a low concentration of nitrates and a high concentration of ammonia salts bear witness to anoxic or even anaerobic conditions in the active parts of the filter, which may be located and confirmed by gas measurements (low values of $O_2$ and high values of $CO_2$).

Suitable global resistivity profiles must also highlight lower resistivities in these zones that are logically the wettest (presence of biomass or stagnant water, in excessive quantities if clogged). This must also be confirmed by the presence of water on the string of rods of the penetrometer and the impossibility of carrying out endoscopic measurements.

There are thus obtained, at most:
an at least partial map of the filter 14 giving its geometrical characteristics and defining different working zones along the resistivity meter profiles P1 to P3; and
at each probing point M1 to M5, the variation of the parameter or parameters measured as a function of depth (for example cone resistance, resistivity and gas concentration).

Using data banks resulting from numerous tests carried out beforehand and analytical mathematical models makes it possible to associate a permeability value $k_1$ with each probing point M1 to M5. This value $k_1$ (or the mean value of the established values $k_1$ forming the global permeability coefficient) may be compared to the range $[k_{min}; k_{max}]$ of predetermined permeability values representing a satisfactory operating state of the purification installation.

Also, the range $[k_{1min}; k_{1max}]$ of values combining some or all of the established permeability values may be compared to the predetermined range $[k_{min}; k_{max}]$ of permeability values referred to above.

In this way, one or more indicators of correct or incorrect operation of the filter 14 are obtained.

EXAMPLE 3

This example refers to an intermediate situation, namely producing a current diagnosis for a filter in operation that has been monitored for several years and some or all of the parameters of which are known already, having been established either during acceptance testing of the filter (Example 1) or at the time of one or more previous diagnoses (Example 2).

In this situation, some or all of the tests carried out in Example 2 are repeated and it is determined whether the operating conditions have improved or deteriorated, given the occupation of the dwelling since the preceding tests. If the performance as estimated directly from semi-quantitative strips or obtained from a database grouping values from other tools is not in compliance, rehabilitation of the filter and/or of all of the system should be scheduled.

In the description above, examples are given in relation to systems using filter media consisting of sand filters. However, the present invention is applicable to systems using filter media other than sand: notably zeolites, coconut chips, etc.

The invention claimed is:

1. A method of diagnosing the operation of a water purification installation of the filter medium device type, the material of the filter medium being made up of particles, the method comprising the following steps:
a characterization step of characterizing at least one physical and/or mechanical parameter of the filter medium device to establish a permeability value Ks (expressed in m/s);
a comparison step of comparing said established permeability value Ks with a predetermined range $[k_{min}; k_{max}]$ of permeability values representing a satisfactory operating state of the purification installation; and
a diagnosis step during which the filter medium device is assigned an operation indicator according to the result of the comparison step.

2. A diagnostic method according to claim 1, characterized in that the predetermined range of permeability values representing a satisfactory operating state belongs to the range defined as follows:

$$0.3 \times 10^{-5} \text{ m/s} < Ks < 0.8 \times 10^{-2} \text{ m/s}.$$

3. A diagnostic method according to claim 1, characterized in that it includes executing the characterization and comparison steps at a plurality of locations of the filter medium device, whereby a plurality of indicators of the operation of the filter medium device are obtained in order to establish a global diagnosis of the filter medium device.

4. A diagnostic method according to claim 1, characterized in that the characterization step includes determining at least two physical and/or mechanical parameters representing the local state of the material of the filter medium device.

5. A diagnostic method according to claim 4, characterized in that the physical parameter representing the local state of the material of the filter medium device belongs to the group comprising the tightness (or compaction) state, the clogging state, the saturation state, the particle sizes, the shape of the grains, the mineralogical class of the material constituting the filter medium, and the percentage of fines constituting the filter medium.

6. A diagnostic method according to claim 1, characterized in that the characterization step includes determining at least one physical and geometrical parameter representing the operating state of the filter medium device.

7. A diagnostic method according to claim 6, characterized in that the physical and geometrical parameter representing the operating state of the filter medium device belongs to the group comprising the resistivity profile, the thickness of the filter medium, and the area of the filter medium device.

8. A diagnostic method according to claim 1, characterized in that it further includes a step of characterizing at least one parameter representing the microbiological activity of the filter medium device.

9. A diagnostic method according to claim 8, characterized in that the parameter representing the microbiological activity of the filter medium device belongs to the group comprising the oxygen concentration, the carbon dioxide concentration, the nitrates concentration, and the ammonia salts concentration.

10. A diagnostic method according to claim 1, characterized in that the purification filter medium device is a sand filter.

11. A tool for diagnosing the operation of a water purification installation of the filter medium device type for use in the method according to claim 1, characterized in that it includes means for characterizing at least one physical and/or mechanical parameter of the filter medium device, including:
   an endoscope; and/or
   a penetrometer; and
   a system for analyzing and processing information from the characterization means adapted to establish a permeability value and to compare it with a predetermined range of permeability values representing a satisfactory operating state of the purification installation, and means for assigning an indicator of the operation of the filter medium device as a function of the result of the comparison step.

12. A diagnostic tool according to claim 11, characterized in that the characterization means further include a resistivity meter using electrodes.

13. A diagnostic tool according to claim 11, characterized in that the characterization means further include a soil gas sampling and analysis system.

14. A diagnostic tool according to claim 11, characterized in that the characterization means further include semi-quantitative strips adapted to measure the nitrates concentration and the ammonia salts concentration in water sampled at the output of the filter medium device.

15. Use of the diagnostic tool according to claim 11 for a purification installation of the filter medium device type, which filter medium device consists of a sand filter.

* * * * *